United States Patent [19]

Andersen et al.

[11] Patent Number: 5,613,511
[45] Date of Patent: Mar. 25, 1997

[54] DEVICE FOR WASHING THE INTERIOR OF A BUILDING, AND A DISTRIBUTION VALVE ASSOCIATED THEREWITH

[75] Inventors: Kurt E. Andersen; Ole Madsen, both of Hurup, Denmark

[73] Assignee: Verntofta AB, Verntofta, Sweden

[21] Appl. No.: 505,282

[22] PCT Filed: Feb. 16, 1994

[86] PCT No.: PCT/SE94/00125

§ 371 Date: Aug. 16, 1995

§ 102(e) Date: Aug. 16, 1995

[87] PCT Pub. No.: WO94/19116

PCT Pub. Date: Sep. 1, 1994

[30] Foreign Application Priority Data

Feb. 16, 1993 [DE] Germany ........................ 0174-93

[51] Int. Cl.⁶ .................................................. B08B 9/00
[52] U.S. Cl. ................ 134/167 R; 134/172; 134/166 R; 137/625.15; 137/625.11; 239/66
[58] Field of Search ............... 134/166 R, 167 R, 134/168 R, 168 C, 167 C, 169 C, 169 R, 166 C, 172, 62; 137/625.19, 625.11, 625.17, 625.12, 625.15, 625.16, 625.46, 625.13; 141/268, 270; 222/485, 482, 502, 503; 234/66, 207, 559, 581.1, 729, 728

[56] References Cited

U.S. PATENT DOCUMENTS

| 825,370 | 7/1906 | Zurbuch | 137/625.11 |
|---|---|---|---|
| 1,205,031 | 11/1916 | Schmitt | 137/625.16 |
| 1,960,515 | 5/1934 | Shield | 137/625.11 |
| 2,206,361 | 7/1940 | Mackay | 137/624.15 |
| 2,720,244 | 10/1955 | Isreeli et al. | 137/625.13 |
| 3,023,778 | 3/1962 | Hayes et al. | 137/625.15 |
| 3,195,585 | 7/1965 | Fechheimer | 141/270 |
| 3,534,711 | 10/1970 | Brunner | 137/625.19 |
| 3,713,462 | 1/1973 | Bushee | |
| 3,995,494 | 12/1976 | Muller et al. | 137/625.11 |
| 4,191,330 | 3/1980 | Sample | 239/66 |
| 4,604,093 | 8/1986 | Brown et al. | 137/625.11 |
| 4,684,040 | 8/1987 | Jonovic et al. | 134/166 R |
| 4,805,648 | 2/1989 | Hour | |

FOREIGN PATENT DOCUMENTS

| 301902 | 11/1917 | Germany | 134/166 R |
| 1083974 | 4/1984 | U.S.S.R. | 239/66 |

Primary Examiner—Frankie L. Stinson
Attorney, Agent, or Firm—Merchant, Gould Smith, Edell, Welter & Schmidt, P.A.

[57] ABSTRACT

A distribution valve for a high-pressure pump comprises a closed valve housing (1), in which a valve rotor (2) is rotatably mounted. The valve rotor is adapted during rotation, preferably indexing, to alternately open and close the flow path to a series of outlet ports (8) in the valve housing, such that the pumping medium is distributed via the ports concerned out to individual nozzles disposed in a succession. The distribution valve is extended especially for use in a device for washing the interior of a building. The device comprises a carriage, which is movable back and forth and has a frame on which the nozzles are mounted.

8 Claims, 2 Drawing Sheets

DEVICE FOR WASHING THE INTERIOR OF A BUILDING, AND A DISTRIBUTION VALVE ASSOCIATED THEREWITH

FIELD OF THE INVENTION

The present invention relates to a distribution valve for a high-pressure pump, especially for sequential distribution of a pressure medium to several different outlets successively, from one and the same pump. More specifically, the invention relates to a valve of the type recited in the preamble of appended claim 1. The invention also relates to a device for washing the interior of a building, especially a stable.

DESCRIPTION OF THE PRIOR ART

The pump here concerned may be e.g. a conventional high-pressure cleaner, and the pumping medium may be clean water or water admixed with a cleaning agent and/or a disinfectant for automatic cleaning of the interior of a stable. According to the prior art, the liquid is distributed through a number of nozzles connected to the high-pressure cleaner, and the nozzles are caused to operate alternately after one another. In this manner, it is possible to treat a very large area in one and the same operation by using a cleaning robot adapted to the size and shape of the building and equipped with a distribution valve and a single high-pressure cleaner. The nozzles are mounted on a drivable stand, which is slowly moved in the longitudinal direction through the building from one end to the other while the nozzles are successively cleaning and disinfecting the walls and the ceiling.

All the nozzles being not in operation simultaneously depends on the limited capacity of the high-pressure cleaner. The high-pressure cleaner (if of conventional design and size) is only able to operate with one nozzle at a time, possibly two nozzles under certain conditions. If several nozzles are used with the high-pressure cleaner, the pressure will drop and the dynamic cleaning effect fail.

On account of the relatively high pressure used (16–18 MPa), distribution valves of conventional type, for instance solenoid valves and sequential valves, are not suitable. Among other things, the known valves are not sufficiently pressure-sustaining, and a pressure rise is produced in the system during the nozzle-switching operation. The demands to be placed on the distribution valve in terms of operation are as follows: a simple, wear-resistant and robust design, leak proofness at high operating pressures and gentle retroaction on the high-pressure cleaner during the switching operation of the valve. Moreover, the valve should be corrosion- and chemical-resistant.

SUMMARY OF THE INVENTION

The object of the present invention is to provide a distribution valve and a device for washing the interior of a building that remove the above-mentioned drawbacks and meet the above-mentioned criteria.

According to the invention, this object is achieved by means of a distribution valve having the features recited in appended claim 1, and a device having the features recited in appended claim 8. Preferred embodiments are recited in the appended subclaims.

The distribution valve according to the invention is of a type comprising a closed valve housing, in which a valve rotor is rotatably mounted. The valve rotor is adapted during rotation, preferably indexing, to alternately open and close the flow path to a series of outlet ports in the valve housing, the pumping medium being distributed through the ports concerned out to the respective nozzles in a programmable sequence.

The blocking plungers mounted in the valve rotor on a level with the bores in the valve housing are maintained pressed against the wall of the distributing chamber by the liquid pressure acting behind the plungers, and preferably also by a spring, such that the surfaces of the plungers engaging the wall of the distributing chamber efficiently and sealingly block the bores in the distributing chamber when the blocking plungers are in a position opposite thereto. The bore (or bores) in the rotor that is not provided with a blocking plunger leads the pumping medium out through the port with which it is in registry, i.e. the associated nozzle is activated. The other nozzles are inoperative.

When the distribution valve after a suitable time interval, for example a few seconds, switches to the next valve position by indexing the rotor, the sealing effect produced by the blocking plungers will be suspended, which occurs at the same instant as the plungers are rotated away from the bores in the distribution chamber. Therefore, all the outlet ports will be under pressure during the very switching operation, resulting in that the pressure hoses out to the nozzles will constantly be completely filled with liquid. When a new port is opened, the associated nozzle will therefore immediately start operating (spraying) at full pressure, i.e. there is no waste of time or of liquid for again building up the pressure in the hose. Without the necessary working pressure, the dynamic cleaning effect of the nozzle will be insufficient.

The fact that there is a liquid flow through the distribution valve even during the switching operation means that no pressure rise will occur in the system when the distribution valve is switching. This would be the case if the valve had completely shut off the liquid flow during the switching operation, and the resulting pressure rise would then bring about an actuation of the pressure relief valve integrated in the high-pressure cleaner. Such repeated actuation would be devastating for the pressure relief valve and would at the same time produce an unnecessary load on the high-pressure pump.

Suitably, the blocking plungers consist of TEFLON® or a similar self-lubricating and chemical-resistant plastics material. As a result, the plungers will produce the aimed-at sealing effect and are at the same time highly wear-resistant, i.e. will have long service life. Also the thrust bearing may advantageously consist of TEFLON®.

In a preferred embodiment, the pressure medium will be pressed out through the lubricating nipple when the O rings are worn. This is a simple indication of the valve being worn and requiring servicing. By welding together the valve housing, this will be assembled in a highly efficient and leakproof manner. It will thus be possible to keep down manufacturing costs and ensure that repairs (exchanging gaskets etc.) are carried out in an authorised shop.

BRIEF DESCRIPTION OF THE DRAWINGS

The invention will be described in more detail hereinbelow with reference to the accompanying drawings, in which.

DESCRIPTION OF THE PREFERRED EMBODIMENT

Figure 1:
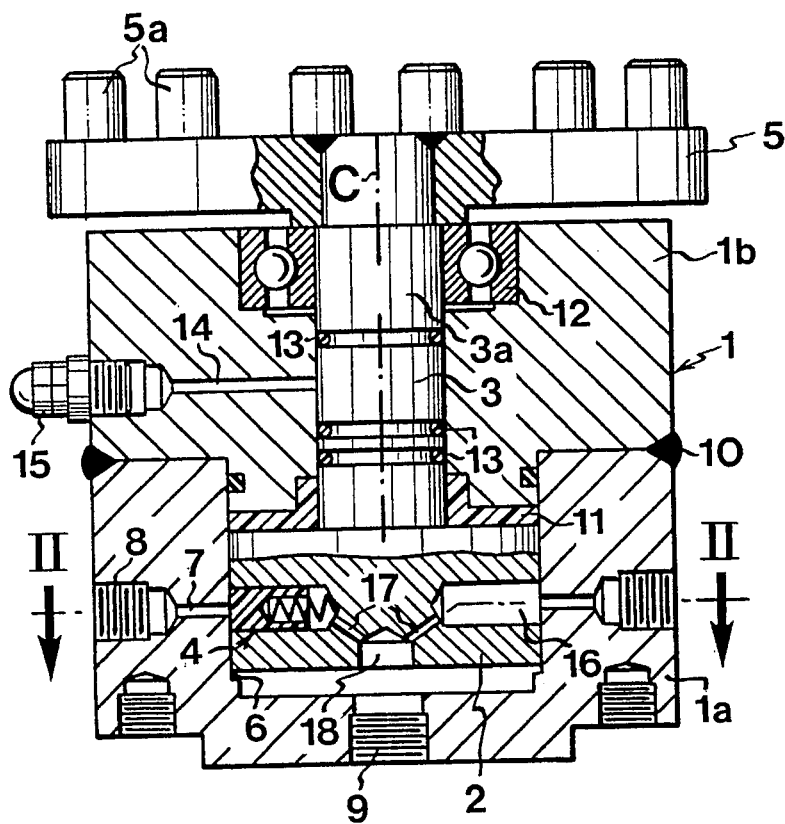
FIG. 1 shows a distribution valve according to the invention in longitudinal section.
Figure 2:
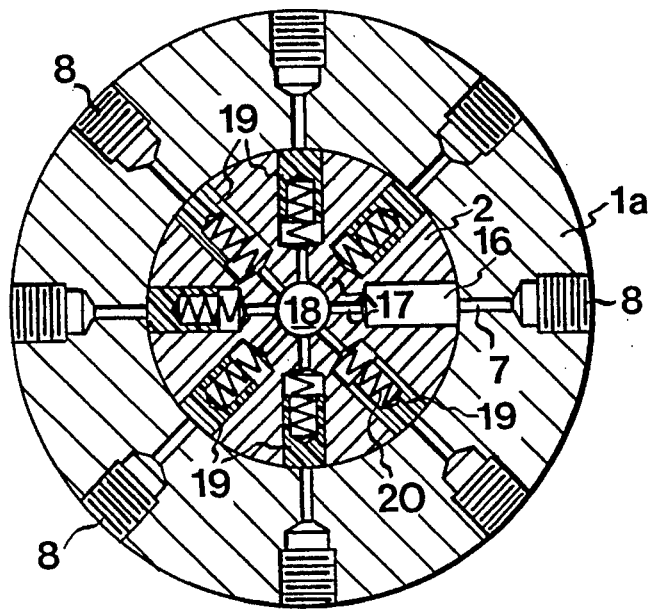
FIG. 2 is a cross-section of the same valve taken along the line II—II in FIG. 1.
Figure 3:
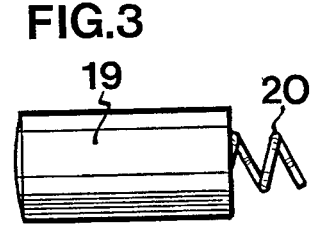
FIG. 3 shows a single blocking plunger from the side.
Figure 4:
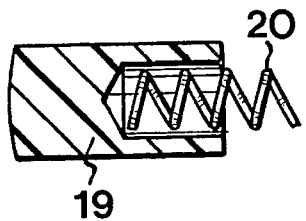
FIG. 4 shows the same plunger in longitudinal section, and FIG. 5 schematically illustrates a cleaning robot in operation in a stable.

In the embodiment shown in FIGS. 1–4, the distribution valve basically comprises a valve housing 1, a valve rotor 2 with an associated drive shaft 3, a number of blocking plungers 4 and a coupling or drive disc 5 provided with studs and mounted at the end of the drive shaft 3.

The valve housing is composed of a bottom part 1a, in which the rotor 2 is mounted, and a top part 1b accommodating the bearing and gasket system of the drive shaft 3. The bottom part 1a has a concentric bore 6, in which the valve rotor 2 is mounted. In association with the bore 6, the valve housing is formed with a number of radial bores 7. These bores are arranged with angular spacing in the same plane and at right angles to the axis of rotation (the axis of symmetry of the valve housing). Each bore 7 communicates with an outlet port 8. A central inlet port 9 for pressure medium is disposed at the very bottom of the bottom part 1a of the valve housing and communicates with the bore 6.

The two parts 1a and 1b of the valve housing are assembled round the rotor 2 and its drive shaft 3, and subsequently sealingly joined together by a full weld at 10. The drive shaft 3 is mounted with the rotor end in a TEFLON® thrust bearing 11, and with the drive end 3a in a closed ball bearing 12. Between the two bearings are mounted a number of O-ring seals 13 of conventional type. Moreover, there is provided a lubricating channel 14 with an associated lubrication nipple 15 with its check valve ball removed. In the free end (drive end 3a) of the shaft is mounted the studded disc 5 for indexing by means of a pneumatic cylinder (not shown). The studs are designated 5a, and their angular spacing corresponds to that of the bores 7 in the valve housing.

On a level and in registry with the bores 7, the rotor 2 has a series of radial bores 16. The number of the bores 16 corresponds to the number of bores 7 in the valve housing and the angular spacing is the same. By internal connecting bores 17, the bores 16 are each connected to a common central bore 18 at the very bottom of the rotor 2, i.e. all the bores 16 communicate with the inlet port 9 at the very bottom of the valve housing. A blocking plunger 19 is mounted in each bore 16, with the exception of one bore. The blocking plungers are held engaged with the wall of the bore 6 of the valve housing under the action of a compression spring 20. The hydraulic pressure contributes to increasing the sealing effect of the plungers 19. The function and the operation of the plungers 19 are as described in the foregoing. For proper sealing performance, the engagement surfaces of the plungers 19 are conformed to the shape of the bore 6, i.e. have the same radius of curvature, see FIG. 3. The plungers 19 consist of TEFLON®.

Figure 5:
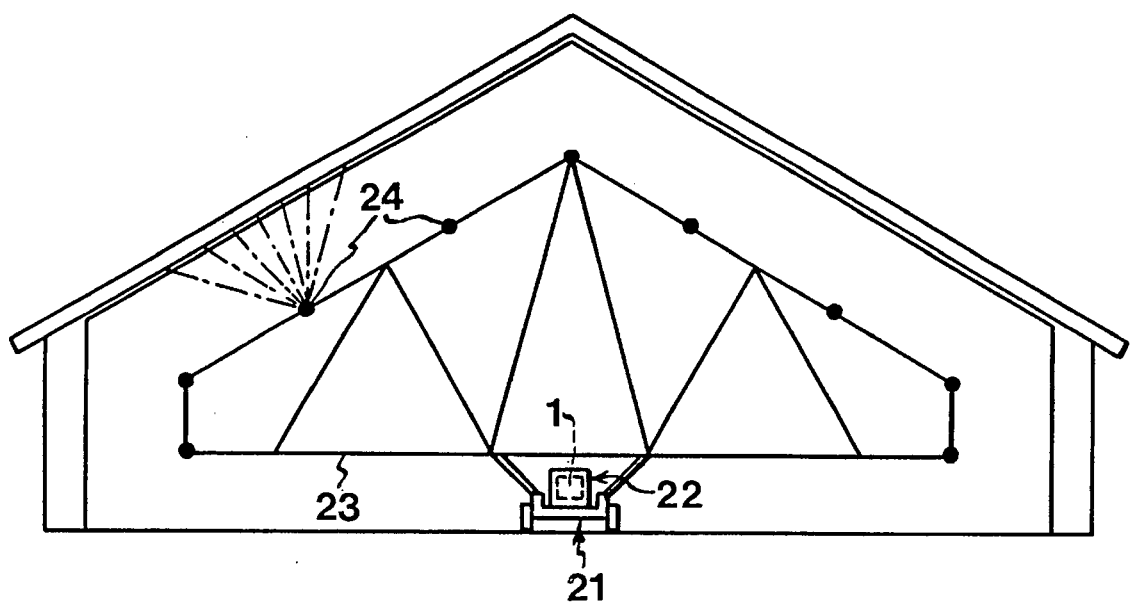

FIG. 5 shows an example of a device according to the invention in the form of a cleaning robot based on a single high-pressure cleaner 22, a number of nozzles 24 and a distribution valve 1 according to the invention. The distribution valve 1 is preferably mounted on the high-pressure cleaner 22 supported by a carriage 21. The cleaner robot comprises the carriage 21, which is drawn slowly through the building to be cleaned, generally a poultry-house, a piggery or the like. The carriage 21 also supports a stand or frame 23 on which several nozzles 24 are mounted. The nozzles 24 are disposed at a predetermined distance from and are directed at the parts of the building to be washed. Preferably, the frame 23 is adjustable to premises of different size and shape. Conduits (not shown) for washing liquid are preferably integrated in the parts of the frame 23. During one operation, which may take up to several hours and during which the robot is pulled from one end of the building to the other, total cleaning and disinfection of the interior of the building is carried out. The displacement of the carriage 21 is ensured by means of an automatic traction mechanism, i.e. no personnel is required therefor. This technique can also be used to other related ends, such as the flushing of tanks.

The invention is not restricted to the embodiment described above and shown in the drawings. Other combinations of materials and other detail designs of the valve and the device are conceivable within the scope of the invention.

We claim:

1. A distribution valve for a high-pressure pump, especially for sequential distribution of a pressure medium to several different outlets successively, from one and the same pump, the pump preferably being a so-called high-pressure cleaner (22) and the pressure medium being clean water or water admixed with a cleaning agent/disinfectant to be distributed through a number of nozzles (24) connected to the high-pressure cleaner (22), the distribution valve being of the type comprising a closed valve housing (1), in which a valve rotor (2) is rotatably mounted and adapted, during its rotation, preferably by indexing, to alternately open and close the flow path to a series of outlet ports (8) in the valve housing, the pumping medium being distributed via the ports concerned, out to the nozzles (24), characterised in that the valve rotor (2) is mounted in a valve chamber or distributing chamber which is concentric with the axis of rotation (c) and in the form of a cylindrical bore (6) in the valve housing (1), said chamber being provided with a number of radial bores (7) arranged with angular spacing in one and the same plane and each communicating with one of said outlet ports (8) of the valve;

that the valve rotor (2) on a level with the bores (7) is provided with a corresponding number of radial, cylindrical bores (16), in each of which, with the exception of at least one bore, there is mounted a sealing blocking plunger (4, 19) which is movably mounted in the respective bore and maintained pressed against the wall of the distributing chamber (6) by the liquid pressure and preferably also by a spring (20), the surface of the plunger engaging the wall of the distributing chamber being conformed thereto by having the same radius of curvature with a view to sealingly blocking the bores (7) in the distributing chamber (6) when the blocking plungers (4) are in a position opposite thereto; and that there are further provided in the valve housing (1) at least one inlet port (9) for the pressure medium passing therethrough into the distributing chamber (6), and in the valve rotor (2) a number of axial/radial connecting bores (17, 18), which connect the individual plunger bores (16) in the valve rotor (2) to the discharge side of the distributing chamber (6).

2. A distribution valve as claimed in claim 1, wherein the blocking plungers (19) are made of TEFLON® or an equivalent self-lubricating or chemical-resistant plastics material.

3. A distribution valve as claimed in claim 1, wherein the valve rotor (2) has a coaxial drive shaft (3), which is mounted in a thrust bearing (11) of TEFLON®, and wherein a number of shaft seals (13) of the O-ring type are provided on the drive shaft (3) spaced from said thrust bearing (11) for leakproof sealing of the valve rotor (2) in the distributing chamber (6), and wherein the drive shaft (3) is provided at its free end located outside the valve housing, with suitable coupling or drive means, preferably a studded disc (5), to be used for actuating the valve rotor (2) in its continuous or stepwise rotational motion during the distributing function of the valve.

4. A distribution valve as claimed in claim 3, wherein at least two O-ring seals (13) are provided on the drive shaft (3) in spaced-apart relationship, and wherein there is provided between these at least two seals a lubricating channel (14) to be used for supplying lubricating grease into the valve by means of a conventional grease gun and a force-feed lubrication nipple (15), which however lacks the traditional, built-in ball check valve.

5. A distribution valve as claimed in claim 1, wherein the valve housing (1) is composed of a top part (1b) containing the rotor shaft bearing, and a bottom part (1a) containing the distributing chamber (6) and the inlet and outlet ports, said two parts being joined round the valve rotor/rotor shaft and subsequently permanently fixed to each other by welding.

6. A distribution valve as claimed in claim 5, wherein there is provided at the upper end of the drive shaft (3), a radial bearing, preferably a ball bearing (12), for supporting the shaft.

7. A distribution valve as claimed in claim 1, wherein the valve substantially consists of corrosion-proof and/or chemical-resistant materials, such as stainless steel, bronze and TEFLON®.

8. A device for washing the interior of a building, such as the walls, the ceiling and the floor of a stable, comprising a carriage (21) which is movable back and forth in the building and supports a frame (23), on which a number of nozzles (24) are mounted and disposed at a predetermined distance from and are directed towards the parts of the building to be washed, characterised in that it comprises a distribution valve as claimed in any one of the preceding claims for distributing a pressure medium.

* * * * *

UNITED STATES PATENT AND TRADEMARK OFFICE
CERTIFICATE OF CORRECTION

PATENT NO. : 5,613,511
DATED : Mar. 25, 1997
INVENTOR(S) : Andersen et al.

It is certified that error appears in the above-indentified patent and that said Letters Patent is hereby corrected as shown below:

On the title page, in [30], "[DE] Germany" should read --[DK] Denmark--.

Signed and Sealed this

Twenty-eighth Day of October, 1997

Attest:

BRUCE LEHMAN

Attesting Officer

Commissioner of Patents and Trademarks